Nov. 22, 1966  J. JULLIEN-DAVIN  3,286,528
DEVICE FOR MEASURING FORCES BY APPLICATION OF THE HALL EFFECT
Filed May 7, 1964  2 Sheets-Sheet 1
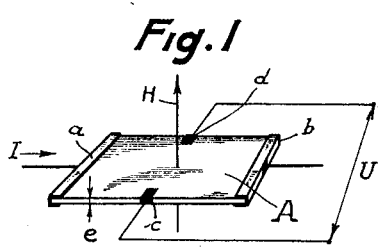
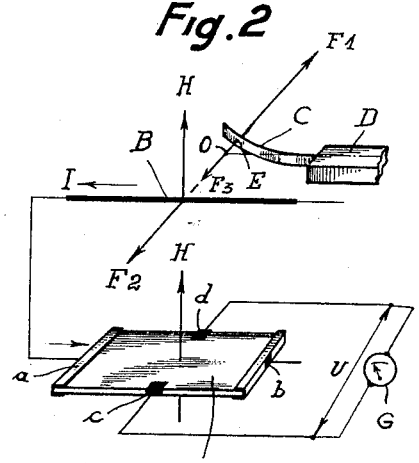
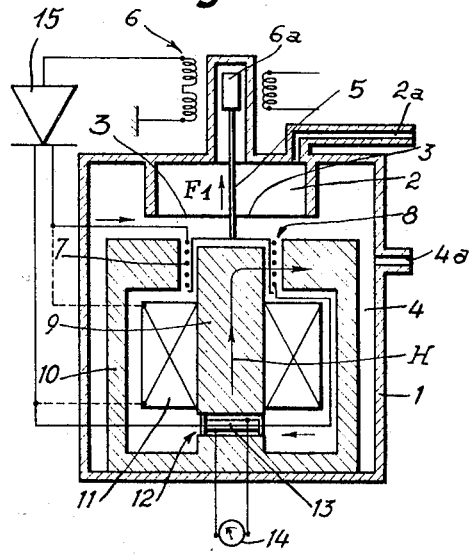
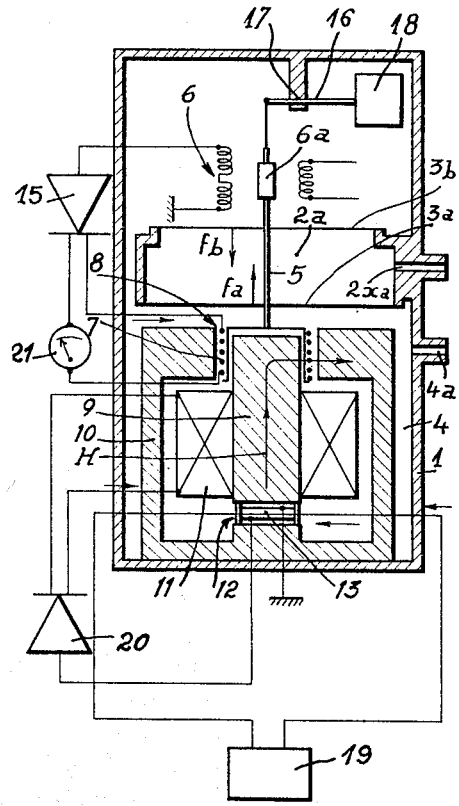
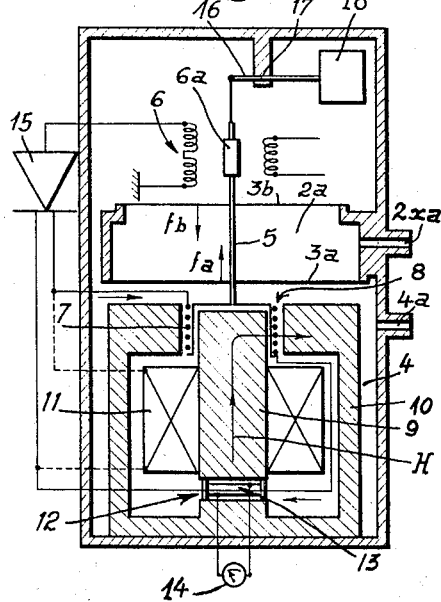

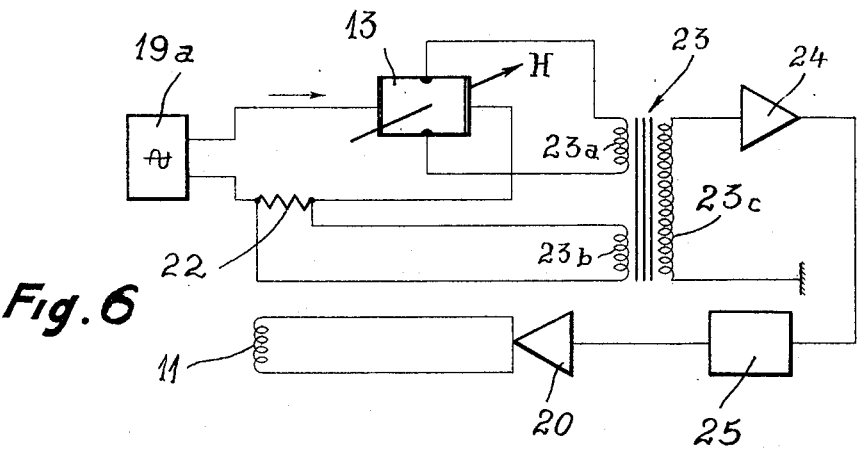
Fig. 6
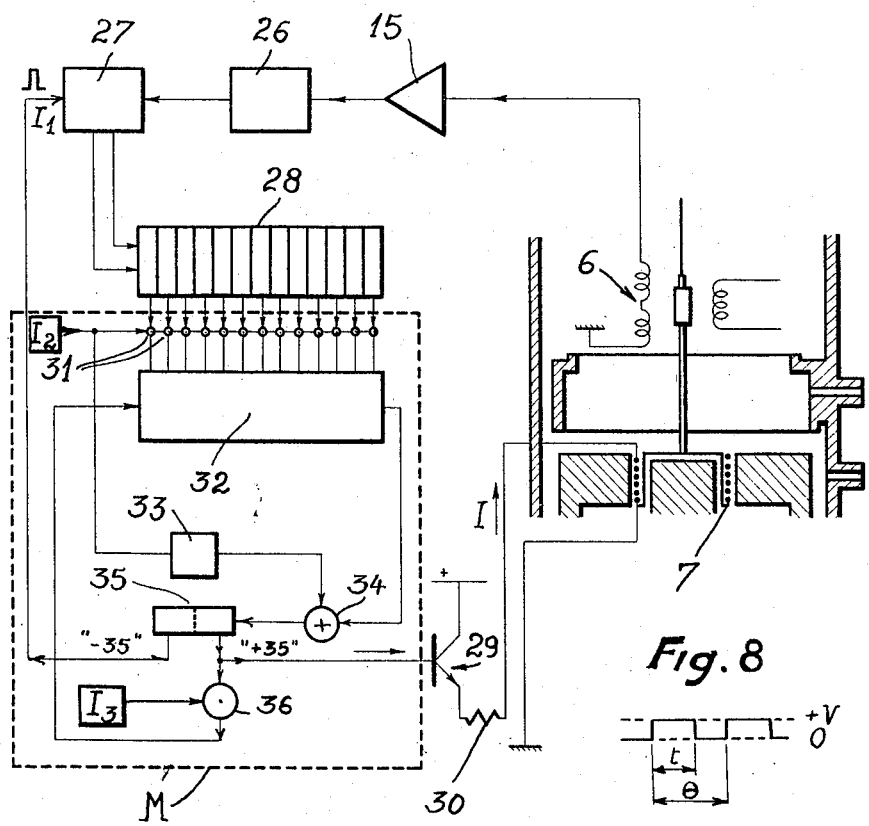
Fig. 7
Fig. 8

United States Patent Office 3,286,528
Patented Nov. 22, 1966

3,286,528
DEVICE FOR MEASURING FORCES BY
APPLICATION OF THE HALL EFFECT
Jean Jullien-Davin, Valence, France, assignor to Crouzet,
Valence, France, a French company
Filed May 7, 1964, Ser. No. 365,687
Claims priority, application France, May 10, 1963,
934,378, Patent 1,364,146; Apr. 20, 1964, 971,568,
Patent addition 85,627
14 Claims. (Cl. 73—398)

The present invention relates to a device which permits the measuring a force by a novel application of the Hall effect which, as is known, consists in the appearance of a potential difference or so-called "Hall voltage" between two opposite edges of a small plate formed of semi-conductor material which, on the one hand, carries an electric current referred-to as a "control current" which is oriented substantially at right angles to the aforesaid edges and, on the other hand, is subjected to a magnetic field at right angles to its surface.

It is recalled that the Hall voltage U is given by the formula:

$$U = \frac{Rh}{e} IH$$

wherein: $Rh$ is what is known as the Hall constant, $e$ is the thickness of the plate, $I$ is the control-current intensity and $H$ is the magnetic field strength.

The apparatus for the measurement of forces by the application of the Hall effect comprises, in combination, on the one hand, means for applying to a movable member, which is subjected to the action of the force to be measured, an opposing force which is in opposite direction with respect to the first and generated under the action of an electric current carried by an electric conductor being placed in a magnetic field, said electric current being regulated by means for detecting the position of the said movable member and, on the other hand, a Hall generator placed in the magnetic field referred to above, means responsive to the Hall voltage being connected to those points of the generator at which said voltage appears.

In preferred forms of embodiment of the novel apparatus, this latter is also characterized by the following points and combinations thereof:

The electromagnetic system for producing the opposing force consists of a core which is magnetized or surrounded by a field coil and one extremity of which is connected to the base of a pot magnet which surrounds said core and the edge of which together with the other extremity of the core delimits an annular air-gap in which a moving coil is free to move parallel to the axis of said core, said moving coil being, on the one hand, coupled mechanically to the movable member and, on the other hand, supplied with a current which is regulated from the means for detecting the position of the said member in order that the opposing force generated by the coil should be brought to the same value as the force to be measured when the movable member is located in the rest position, the Hall generator being placed at a suitable point of the magnetic circuit, preferably within an air-gap of the core itself;

The means for detecting the position of the movable member control an amplifier which supplies the moving coil;

The moving coil is connected in series with the Hall generator in order that the control current of said generator is the current which is supplied to said coil;

The terminals of the Hall generator at which the Hall voltage appears are connected directly, or through the intermediary of a direct-current amplifier, to a voltage indicator (voltmeter) which can be calibrated in forces to be measured;

The field winding of the means for generating the magnetic field is supplied by the amplifier which supplies the moving coil;

In an alternative form, the control current of the Hall generator is supplied from an independent current source whilst the terminals at which the Hall voltage appears are connected to a direct-current amplifier which supplies the excitation current to the means for producing the magnetic field, the apparatus for indicating the force to be measured being suitably a current-measuring instrument which is interposed in the circuit of the moving coil which is placed in the magnetic field and connected to the movable member;

In the case of application of the apparatus to the measurement of pressures, the movable member is integral with the diaphragm of a manometric capsule;

In order to reduce as far as possible the amplitude of movements of the point of application of forces in the case of pressure measurements, the manometric capsule is of the differential type with two diaphragms which are integral with the point of application of forces;

In another alternative form, the Hall generator (or cell) is supplied with an alternating control-current and its output voltage (Hall voltage) is compared with a voltage which is exactly in phase with the control current referred-to and which is proportional to said current;

In the alternative form referred-to above, the Hall alternating-current voltage is applied to a first primary winding of a differential transformer comprising a second primary winding to which is applied a voltage developed at the terminals of a resistance which is series-connected in the circuit through which the control current passes, the value of said resistance being chosen so that the two voltages are equal when the magnetic field to which the Hall generator is subjected has the desired constant value, and the two primary windings referred-to being connected in such a manner that the voltage developed at the terminals of the secondary winding of the differential transformer is equal to the difference in voltages applied to the two primary windings referred-to above, said secondary voltage being amplified and transmitted to a demodulator at the output of which the direct-current voltage obtained is applied to the direct-current amplifier which supplies current to the magnetic field regulating winding;

In yet another alternative form, the current which is supplied to the moving coil which is connected to the movable member and which generates a restoring force is subjected to a digital control system provided by follow-up control means so arranged as to permit the possibility of obtaining directly in numerical form the value of the force to be measured;

The digital control means referred-to above comprise, starting from the alternating current amplifier which is designed to amplify the voltage produced by the means for detecting the position of the movable member, and mounted in serial arrangement, a demodulator, a digital counting and back-counting unit into which pulses are fed either in counting or in back-counting controlled by a switching unit which responds to the sign of the output voltage of the demodulator, said pulses being derived from a unit which is adapted to convert binary-code data defined by the state of the digital counting and back-counting unit into rectangular signals (having constant amplitude and fixed recurrence), the duration of which depends on the state of said counting and back-counting unit, said converting unit being designed to control the operation of an amplifier which supplies the moving coil referred to.

The unit which converts binary-code data into rectangular signals consists of a high-speed pulse generator which is connected to an AND-gate, the output of which is connected to a high-speed counter which is in turn connected, on the one hand, through a series of AND-gates to the counting and back-counting unit and, on the other hand, to one of the inputs of an OR-gate, the other input of which can be controlled, through the intermediary of a delaying monostable device, from a generator which supplies pulses having a period which is that of the constant recurrence of the rectangular signals, this latter generator being also designed to control the aforesaid series of AND-gates whilst the OR-gate controls a flip-flop which, in the "normal" state, simultaneously triggers at one output the AND-gate so as to permit the input of fast pulses to the high-speed counter on the one hand, and the amplifier supplying direct current to the moving coil on the other hand, and which in the complementary state transmits a pulse to the switching unit through another output.

Further particular features and characteristics of the invention will become apparent from the description which follows below and which relates to a few examples of embodiment of the novel apparatus, said examples being given solely by way of indication and represented diagrammatically in the accompanying drawings, in which:

FIG. 1 is a view in perspective of a Hall generator;
FIG. 2 is a view in perspective of the means which form the basis of the invention;
FIG. 3 is a view in axial cross-section of one form of embodiment of a pressure indicator which entails the application of the invention;
FIG. 4 is a view in axial cross-section of an alternative form of the pressure-measuring apparatus of FIG. 3;
FIG. 5 is a view in axial cross-section of another alternative form of the pressure-measuring apparatus of FIG. 3;
FIG. 6 is a synoptic diagram of yet another alternative form of the invention;
FIG. 7 is a diagram which is similar to the preceding, of another advantageous alternative form of the invention;
FIG. 8 is a diagram of the control voltage of the supply current to the moving coil.

A Hall generator consists, as can be seen from FIG. 1, of a small plate A which is formed of semi-conductor material.

When a control current having an intensity I is caused to flow between the edges $a$ and $b$ of said plate which has a thickness $e$, and when the plate is placed in a magnetic control field having a density H at right angles to the plane of said plate, there is accordingly developed at the opposite terminals $c$ and $d$ a potential difference (Hall voltage).

$$U = \frac{Rh}{e} IH$$

In view of the fact that $Rh$ (Hall constant) and $e$ are constants:

$$\frac{Rh}{e} = K; \text{ hence } U = KIH$$

For the application of the Hall generator to a dynamometer, the basic concept is that shown in FIG. 2 in which the reference C designates a flexible strip which is fixed at D and at the point E of which is applied the force F1 which it is intended to measure.

There is mechanically coupled at the point E (for example by means of a wire) a conductor B through which flows a current having an intensity I and which is placed in the same magnetic field H as the Hall generator which has already been described in reference to FIG. 1. Said generator is connected in series with the conductor B so that the control current of the generator is accordingly the current I which flows through the conductor B, whilst the arrangement is such that the field H is perpendicular to said conductor.

Applying the law of Laplace and the rule of Ampere, the conductor B is subjected to a force F2 which is perpendicular to the plane defined by said conductor B and the direction of the lines of force, this force being given by the expression:

$$F2 = K2IH$$

It is possible to regulate the force F2 by producing a variation of I or of H, or of both I and H at the same time.

In fact, it can be seen that F2 and U have the same expression, hence:

$$F2 = K'U$$

In order to know F2, it is merely necessary to measure U at the terminals $c$ and $d$ of the Hall generator.

When no force is present, the strip C occupies a rest position which is materialized by the point O.

Under the action of an unknown force F1 which is applied to the strip C, this latter is deflected.

When the current I is delivered, the different forces applied to the point E are:
F1 which is intended to measure;
F2 which is produced by the current I and the field H;
F3 which is produced by the elasticity of the strip C.
We may write:

$$F1 = F2 + F3$$

If F2 is caused to vary (for example by regulating I) in such a manner as to restore the point of application of forces to the position O, the force F3 becomes zero and finally:

$$F1 = F2 = k'U$$

The value of F1 can therefore be read directly from a galvanometer G having a high internal resistance, and the dial of which is preferably directly graduated in forces. In order to obtain a more accurate reading, use will be made of a vacuum-tube voltmeter in which the input resistance is practically infinite.

For the sake of clarity of the theoretical explanation given above, it has been assumed that the position O of the flexible strip C is located visually by the operator, but it will be understood that this position can be located automatically by means which are known by the name of position detector and that a detector of this type can be employed for the purpose of automatically controlling the current intensity I or field H or both so as to achieve the relation:

$$F1 = F2$$

In the practical instrument, it is self-evident that the conductor B will not be a straight lead-wire but rather a coil placed in the radial magnetic field produced in the annular air-gap of an electrodynamic device of the Rice-Kellogg type, that is to say a magnetized core arranged within a pot magnet and one extremity of which is connected to the base of the pot magnet whilst the free edge of this latter is located near the outer extremity of said core so as to define with said core an annular air-gap in which a coil is adapted to move freely and coaxially with the core, said coil being designed to carry a current which controls the axial position of said coil.

The novel apparatus, the definition and principle of operation of which have been brought out in the foregoing, can be employed for the purpose of carrying out any measurement of physical parameters which are capable of being functionally associated with a force.

The specific examples given in the following description relate to the measurement of pressures. In fact, if the force F1 is produced by a pressure P acting on a flexible diaphragm having a surface area S, the novel apparatus permits the measurement of P inasmuch as S is constant.

$$F1 = PS = F2 = k'U$$

$$P = K''U$$

FIG. 3 represents the application of the invention to a differential pressure detector. In this form of embodiment, a sealed casing 1 containing the majority of the component parts of the apparatus has a cavity 2 which is separated by a diaphragm 3 from the chamber 4 defined by the casing. A pessure P1 prevails within the cavity 2 which is fitted with a connector 2a, whilst a pressure P2 prevails within the chamber 4 which is fitted with a connector 4a.

It will be assumed that, in principle, P1<P2, with the result that the diaphragm 3 is subjected to a force F1 which is proportional to the difference in pressures:

$$F1 = k1(P2-P1)$$

The diaphragm 3 is coupled, by means of a rod 5, to the magnetic core 6a of a magnetic detector (position detector) 6 of a well known type, the arrangement being such that, when P1=P2, the core 6a takes up a position such that the signal supplied by the detector 6 is zero.

The detector 6 could equally well be a contact detector or a capacitive detector.

The rod 5 also couples the diaphragm 2 to a coil 7, the turns of which are located in a field H which is created in the air-gap 8 of a magnetic circuit comprising a core 9 and a pot 10 and energized by a winding 11.

There is located in the magnetic circuit a second air-gap 12, occupied by the Hall generator 13 through which the field H passes. The terminals of said generator at which the Hall voltage appears are connected to a voltage-measuring instrument 14.

The control circuit of the generator 13 is connected, in series wiht the winding of the coil 7, at the output of a direct-current power amplifier 15 which is controlled by the position detector 6.

The fielding winding 11 can be supplied with current either through the amplifier 15 or from a separate current source. In an alternative form, it would be possible to dispense with the field winding (or to limit the action of said winding to the correction of excitation) and to employ a permanent magnet as the core 9.

In the device which has just been described, any displacement of the diaphragm 3 under the action of a pressure difference P2−P1 which creates a force F1 develops (as a result of the corresponding displacement of the core 6a) in the windings of the detector 6 a voltage which, applied to the amplifier 15, produces the current I which flows through the coil 7 as well as, by way of control current, through the Hall generator.

The coil 7 accordingly generates a force $$F2 = K1HI$$

which balances the force F1

$$F1 = K1(P2-P1)$$

This therefore gives the relation:

$$F1 = F2 = K'U$$

The above holds true only if the gain of the amplifier 15 is infinite, which is of course not possible in actual practice.

In fact, equilibrium will be established when the displacement ε of the core 6a of the detector 6 is finally such that the force F2 which is created by the product HI will be equal to:

$$F2 = F\epsilon$$

Fε being the elastic force which results from the deformation of the diaphragm 3. The equation of forces is written:

$$F1 = F2 - F\epsilon$$

which is of no importance if Fε is a linear function of ε and if the signal emitted by the detector 6 is also a linear function of ε.

The form of embodiment of the apparatus which has just been described can undergo a number of different modifications. It accordingly follows, for example, that, by virtue of a shunt, the Hall generator 13 need carry only a part of the current I.

In order that the forces employed are not too great, it is important to ensure that the diaphragm 3 has a small surface area (of the order of one square centimeter, for example), and that, in order to be responsive to low pressures, said diaphragm has a very small thickness of 0.03 to 0.04 millimeter, for example.

However, a thickness of this order is incompatible with the rigidity which is required for the purpose of centering the coil 7 within the annular air-gap 8 which should be preferably as small as possible.

In order to circumvent these difficulties, it is an advantage to make use of a compensated manometric capsule of the type shown in FIG. 4, in which the same reference numerals have been employed as those which appear in FIG. 3 in order to designate elements which have already been represented in this figure.

In this form of embodiment of the capsule, this latter consists of two flexible diaphragms 3a and 3b which close the cavity 2a, said two diaphragms having respectively the surface areas Sa and Sb, assuming that Sa>Sb.

A pressure P1 prevails within the cavity 2a through the intermediary of the connector 2xa whilst a pressure P2 prevails within the chamber 4 through the intermediary of the connector 4a, assuming that P1<P2.

The two diaphragms 3a and 3 b are coupled together by means of the rod 5 which is also coupled to the coil 7, to the core 6a of the detector 6 and to a two-arm lever 16 which is pivoted at 17 and carries a counter-weight 18.

The diaphragm 3a is urged in the direction of the arrow fa by a force:

$$Fa = Sa(P2-P1)$$

The diaphragm 3b is in turn urged in the direction of the arrow fb by a force:

$$Fb = Sb(P2-P1)$$

The combined assembly of the two diaphragms which are coupled together is accordingly urged in the direction of the arrow fa by a force:

$$F1 = Fa - Fb = (Sa - Sb)(P2 - P1)$$

By choosing Sb fairly close to Sa, it can thus be ensured that the force F1 will remain small.

In the case of diaphragms 3a and 3b having a large diameter, the assembly will be:

Flexible in the longitudinal direction of the rod 5, thereby ensuring good sensitivity;

Very rigid in the transverse direction with respect to the rod 5, thereby permitting of very accurate centering of the coil 7 within an air-gap 8 which is as small as possible.

The operation of this form of embodiment is exactly the same as that of the apparatus which is represented in FIG. 3, to which there has been added the improvement which consists in the presence of the counter-weight 16 which balances the mass of the entire assembly consisting of the core 6a, the rod 5 and the coil 7, thereby making the apparatus insensitive to accelerations.

When it is desired to provide an absolute pressure indicator, the chamber 2a is emptied and sealed off.

The device of FIG. 4 has an additional advantage over that of FIG. 3 in that the core 6a is no longer located inside the cavity of the manometric capsule but inside the chamber 4. Since the said core is usually made of ferrite, it can give rise to a high rate of gas elimination which, if said core were in the vacuum cavity 2a, would be detrimental to the quality of the vacuum.

In FIG. 5, there has been shown another mode of utilization of a Hall generator; this form of embodiment permits of more accurate measurements than those which are obtained by means of the preceding arrangements.

For the sake of simplicity of the description which now follows, the same reference numerals as those which have been previously employed again serve to designate elements which have already been described.

It is known that the Hall generator has a linearity of 2 per 1,000. In order to obtain a more accurate measurement, is merely necessary to employ only a very small portion of the generator characteristic.

To this end, there is passed through the generator a control current having a constant intensity Ic as supplied from a constant current source 19 of suitable type. At this moment, the Hall voltage $U=KIcH$ is proportional to the field $H: U=K_2H$.

The current source 19 can also be an alternating-current source, a source of rectangular signals, etc.

The output voltage U again has the wave-form of the input voltage but its amplitude is proportional to the field H.

The said voltage U is employed for the purpose of regulating the excitation current Ie in the coil 11 (by comparing said voltage with a reference voltage) by means of a direct-current amplifier 20 (or by any other suitable means) in such a manner that the value H of the magnetic field should remain strictly constant.

In certain cases, it can be an advantage to ensure that the magnetic circuit (9–10) is constituted by permanent magnets producing a magnetic field Ha which is very close to the desired constant value H. Accordingly, the excitation current Ie which flows through the winding 11 only has to carry out a positive or negative correction h of the permanent field Ha in order to obtain the relation:

$$Ha+h=H$$

The power which is consumed in the winding 11 is accordingly very small, which results only in advantages. In particular:

Lower performances are required in the case of the amplifier 20 (or the means which replace said amplifier);

The dissipation of heat by Joule effect within the winding 11 can be very small, thereby facilitating the maintenance of the Hall generator at a constant temperature.

Inasmuch as the field H is constant, the expression:

$$F_2=K_1HI$$

of the force $F_2$ which is exerted by the coil 7 through which flows the current I and which is placed in the constant field H can be written:

$$F_2=CI$$

C being a constant factor.

In the condition of equilibrium:

$$F_1=F_2=CI$$

with the result that the measurement of the force $F_1$ is reduced to the measurement of an intensity, which can be effected by means of a current-measuring instrument or ammeter 21 which is calibrated in forces and interposed in the circuit of the coil 7.

It will be noted that, in the forms of embodiment of FIGS. 4 and 5, the elimination of the counter-weight 18 and the replacement of the manometric capsule by a mass which is maintained in the transverse direction and held elastically in the direction of the rod 5 makes it possible to measure the component of acceleration which is directed along the axis of the said rod 5.

Whatever measurements of force are taken with the new apparatus, it can be seen that the accuracy of measurement is solely dependent on the characteristic of the Hall effect generator. All the variations which are liable to arise from changes in the characteristics of the magnetic circuit and of the coil units have no effect on the measurement.

Inasmuch as the new device does not comprise any mass in motion, information is supplied without delay.

The Hall generator varies very little with ambient temperature: approximately 1% per 100° of temperature variation. When the temperature of the whole assembly is stabilized by means of a thermostat in order to maintain said assembly at a temperature which varies within a range of 10°, the measuring error is less than 1 per 1,000.

In the alternative form which is represented in FIG. 6, the magnetic field H is made strictly constant by virtue of a novel method of current supply to the winding 11 which regularizes this field. In order to obtain this result, the control current of the Hall generator 13 is an alternating current Ic which is derived from a current source 19a and which is supplied through a resistance 22 (having a suitable value R) which is in series with said generator.

The Hall voltage, $U=KIcH$, is applied to the first primary winding 23a of a differential transformer 23 having a second primary winding 23b which is connected to the terminals of the resistance 22 and to which is applied a voltage having a value $U'=K'IcR$. The value R of the resistance 22 is chosen in such a manner as to ensure that $U'=U$ when the field H has the constant value which is desired.

The two primary windings 23a and 23b are connected in such a manner that the alternating-current voltage $U''$ which is induced in the secondary winding 23c of the differential transformer 23 is equal to the difference in voltages U and $U'$ ($U''=U-U'$). If $U=U'$, we therefore have $U''=0$.

If the current Ic varies when the field H is stationary, said variation in intensity will produce a variation of U and of $U'$ but the sign (or the phase) of the difference $U-U'$ will not be changed; and if H is such that $U=U'$, we will have $U''=0$, which shows that the current source 19a does not need to be particularly stable.

On the contrary, if H varies, the alternating-current voltage which appears at the secondary winding 23c has a phase which is a function of the direction of the variation of H and the value of which is proportional to the amplitude of this variation of field.

The voltage $U''$ which appears at the secondary winding 23c is amplified by the alternating-current amplifier 24, then applied to the demodulator 25, at the output of which appears a direct-current voltage V, the sign of which is a function of the direction of variation of H and the value of which is proportional to said variation.

The voltage V of the demodulator 25 controls the D.C. amplifier 20 which supplies the coil 11 for regulating the magnetic field H.

In the alternative form which is represented in FIG. 7, the winding 7 (which is connected to the point of application of the force to be measured) is excited by a current controlled by a digital control system.

The said digital control system is so designed as to obtain the value of the force which is measured (for example of the pressure in the case of FIG. 5) directly in a numerical form.

The follow-up control means which make this result possible comprise, starting from the A.C. amplifier 15 which is controlled by the position detector 6, a demodulator 26 which controls a switching unit 27 so arranged as to direct, towards a digital counting and back-counting unit 28, pulses which are supplied through a channel $I_2$ (and which are supplied to the switching unit in a manner which will be described hereinafter) in such a manner as to ensure that said pulses pass into said counting and back-counting unit 28, either in counting or in back-counting, depending on the sign of the voltage which appears at the output of the demodulator 26, that is to say depending on the phase of the current which originates from the detector 6, the state of the counting and back-counting unit 28 remaining unchanged if the voltage referred-to above is zero.

An assembly M makes it possible to convert the numerical data contained in the counting and back-counting unit 28 into analog data represented by rectangular signals having constant amplitude and fixed recurrence $\theta$, the duration $t$ of which depends on the state of the counting and back-counting unit 28. The said signals control a D.C. amplifier 29 (integrator amplifier) which supplies the winding 7.

The unit M which supplies to the winding 7 a mean current I which is proportional to the surface area of the rectangular signals comprises AND-gates 31 which, on the one hand, are controlled by pulses supplied through a channel $I_2$ from a generator which produces pulses having a period of recurrence $\theta$ which is constant and corresponds to that of the rectangular signals and, on the other hand, carry out the recopy, in a high-speed counter 32, of the complementary state of the counting and back-counting unit 28. These same pulses are supplied to a monostable device 33 which, with a slight delay (in order to allow time for the recopy to take place) controls through the intermediary of an OR-gate 34 a flip-flop or bistable device 35. In the normal state "35," the flip-flop 35 triggers the amplifier 29 and at the same time opens an AND-gate 36 which controls the transmission to the high-speed counter 32 of fast pulses which are supplied through a channel $I_3$ from a high-speed pulse generator.

At a given moment, the high-speed counter 32 attains its maximum state. It is the moment when it has received through the intermediary of the AND-gate 36 a number of pulses which is equal to the number represented by the state of the counting and back-counting unit 28. The time which is necessary for the input of said pulses defines the time $t$ of each of the rectangular signals which are sent to the amplifier 29; this time is therefore proportional to the value which is recorded in the counting and back-counting unit 28.

The following fast pulse which the AND-gate 36 has permitted to pass through has the effect of bringing the high-speed counter 32 to the zero state. During this passage, the high-weight figure which was at state 1 changes to the zero state (this is the only case in which the high-weight figure changes from state 1 to the zero state). This change of state which indicates the end of the fast count controls, through the intermediary of the OR-gate 34, the flip-flop 35 which accordingly changes over to the complementary state "$\overline{35}$." In this state, the flip-flop 35 blocks the amplifier 29 and prevents the passage through the AND-gate 36 towards the high-speed counter 32 of fast pulses which are supplied from the channel $I_3$. However, in this state "$\overline{35}$," the flip-flop sends a control pulse to the switching unit 27. This pulse is lost if said switching unit does not receive any voltage from the demodulator 26 but is admitted for counting or back-counting in the counting and back-counting unit 28, depending on whether the demodulator 26 supplies to the switching unit 27 a positive or negative voltage. A new pulse in channel $I_2$ causes the preceding cycle to start again.

The pulse generators which supply the channels $I_2$ and $I_3$ are synchronized; the number of pulses which are supplied from channel $I_3$ can, for example, be 10,000 per slow period (or pulse) $\theta$ derived from channel $I_2$. It will be understood that the two pulse generators could be replaced by an assembly comprising a high-speed pulse generator which is associated with a high-speed counter which changes back to zero state each time it is saturated, the change-over from the saturated state to the zero state having the effect of producing a pulse in channel $I_2$.

The follow-up control system which has just been described operates as follows:

When there is a condition of equilibrium (restoring force generated by the winding 7—through which the mean current I passes—which exactly balances the force, for example a pressure, which is assumed to be constant), the detector 6 delivers a zero alternating-current voltage; the amplifier 15 does not apply any voltage to the demodulator 26, the output voltage of which is zero. The switching unit 27 then prevents any admission of a pulse into the counting and back-counting unit 28, the state of which remains stationary. Since the duration of the rectangular signals remains constant, the mean current I in the winding 7 also remains constant and equilibrium is accordingly maintained.

When the force to be measured varies, the detector 6 applies a voltage which is amplified by the amplifier 15 to the demodulator 26, at the output of which therefore appears a D.C. voltage, the sign of which depends on the phase of the voltage supplied by the detector 6, that is to say on the direction of variation of the force to be measured.

At this moment, the switching unit 27 permits the counting or back-counting of the pulses and the state of the counting and back-counting unit 28 will accordingly change; the duration of the rectangular signals (or square-wave signals) will either increase or decrease, with the result that the mean current intensity I in the winding 7 will in turn either increase or decrease so as to restore the condition of equilibrium.

This system of control of the mean current I which is passed through the winding 7 has a large number of advantages, as will be indicated hereinafter:

(1) It has been seen above that, when there is a condition of equilibrium, the position detector 6 supplies a zero voltage, which means that the force to be measured is strictly compensated by the restoring force which is generated by the winding 7. In fact, in the follow-up control systems which have been contemplated at the beginning of this specification, the detector 6 delivers, when there is a condition of equilibrium, a voltage which is proportional to the force to be measured, which is possible only if allowance is made for a small variation of position which introduces the linearity of the detector 6 into the accuracy of the device. In the case of a pressure indicator, this linearity is that of the elastic force of the diaphragm as a function of the variation of position.

(2) The pure binary number which is recorded by the counting and back-counting unit 28 is proportional to the force to be measured. In the case of a pressure indicator, this binary number is proportional to the pressure which is measured. The novel system of follow-upon control in accordance with the invention therefore carries out, without intervention of any mechanical elements or contacts, the coding in pure binary notation of the data supplied by the apparatus. The data thus coded can be processed directly by digital computer, by means of an output recopy of known type.

(3) The mean current I which passes through the winding 7 depends on the surface area of the rectangular signals, that is to say on the amplitude thereof which is constant and on their duration which is variable and depends on the state of the counting and back-counting unit 28. In point of fact, it is possible to choose at will the amplitude of these signals and steps can accordingly be taken to ensure that the state of the counting and back-counting unit 28 is such that the low-weight figure represents a certain fraction of the measuring unit of the physical quantity to be measured. In the case of the measurement of pressure, for example, steps can be taken to ensure that the low-weight figure represents $\frac{1}{4}$ or $\frac{1}{10}$ or $\frac{1}{100}$, etc. of a millibar.

(4) The mean current I which is passed through the winding 7 represents in analog form the physical quantity to be measured. It is therefore possible to collect at the terminals of a resistance 30 which is series-connected in the circuit between the amplifier 29 and the winding 7 a voltage which is proportional to the physical quantity to be measured. Said voltage can be processed in an analog receiver, for example a galvanometer.

It has been assumed in the foregoing that, when there is a condition of equilibrium, the state of the counting and back-counting unit 28 remains unchanged. In actual fact, oscillations will take place around said condition of equilibrium and there will continuously take place a succession of counting and back-counting processes. This does not present any disadvantage if the force to be measured (a pressure, for example) is fairly substantial, but the said counting and back-counting process becomes particularly trouble-some in the vicinity of zero value, in other words when the physical quantity to be measured is equal to zero or in the vicinity of zero. In fact, when the counting and back-counting unit 28 is at zero, there is a risk of alternately back-counting 1 and counting 1, which is equivalent to changing from the state 0 to its complement (maximum state), or in other words from minimum intensity to maximum intensity in the winding 7.

Two solutions are offered in order to overcome this disadvantage:

The first solution consists in preventing back-counting by a known means when the state of counting and back-counting unit 28 is below a certain value.

The second solution consists in taking steps to ensure that the zero value of the force to be measured does not correspond to the zero state of the counting and back-counting unit 28 but to a different state, for example 100, which amounts to the addition of a small force of constant value to the force to be measured. In the case of a differential pressure-measuring device in which the low-weight figure would be made to correspond to ¼ of a millibar, this would consist in regulating the position detector 6 in such a manner that, in the case of zero pressure, the counting and back-counting unit 28 is in the state of 100 whereas the zero state of said counting and back-counting unit accordingly corresponds to a negative pressure of —25 millibars.

The advantage of this second solution lies in the fact that it permits the measurement of low negative differential pressures. Furthermore, if so required, zero pressure could be made to correspond to the mean state of the counting and back-counting unit 28, which would permit the possibility of measuring those positive or negative differential pressures which are comprised between two limits, provided that said limits are in turn comprised within a range which is delimited by values corresponding respectively to the zero state and to the maximum state of the counting and back-counting unit 28.

The digital follow-up control system which has just been described is of particular interest in the design of a differential pressure indicator and an absolute pressure indicator which are both intended to feed these parameters into an air data computer.

It will readily be understood that the examples of embodiment and of application of the novel device, as described in the foregoing and as represented in the accompanying drawings, have been given solely by way of indication and not in any sense by way of limitation and that it is possible, on the one hand, to make any and all detail modifications in the various forms of embodiment and, on the other hand, to contemplate applications other than those which have been more specifically indicated, without thereby departing either from the scope or the spirit of the invention.

What I claim is:

1. Device for measuring a force which is exerted on a movable member, said device comprising: means for producing a magnetic field; a Hall generator comprising a semiconductor strip having input and output terminals, the semiconductor strip being disposed in said magnetic field and at right angles to said field and the input terminals of the semiconductor strip being connected to a control circuit comprising a control current source; an electric conductor placed in the magnetic field in such a manner as to cut the lines of force thereof, the electric conductor being coupled to said movable member and connected in series with the Hall generator in said control circuit; means for detecting the position of the movable member and adapted to control the source of control current as a function of said position of the movable member in order that a current which creates an opposing force in opposite direction with respect to the force to be measured flows in the electric conductor; and an electrical measuring apparatus connected to the output terminals of the Hall generator.

2. Measuring device as claimed in claim 1, wherein: the means for producing the magnetic field consist of a magnetizable core and a pot magnet having a base which is coupled to one extremity of said core whilst the portion opposite to said base surrounds the other extremity of said core so as to leave an annular air-gap; the electric conductor which is coupled to the movable member being a coil disposed within said annular air-gap and movable with the movable member parallel to the axis of the core.

3. Measuring device as claimed in claim 2, said means for producing the magnetic field further comprising a field coil which surrounds the core and said control current source comprising an amplifier whose input is connected to the position detector and whose output is connected to said field coil.

4. Measuring device as claimed in claim 1, wherein the control current source is an amplifier whose input is connected to the position detecting means and whose output is connected to the input terminals of the Hall generator in series with the electric conductor.

5. Measuring device as claimed in claim 1, wherein the means for detecting the position of the movable member consist of a transformer having a moving core which is coupled to said movable member, a primary winding connectable to a current source and a secondary winding which is formed of two series-connected portions of winding which are wound in opposite directions relatively to each other and connectable to the control current source.

6. Measuring device as claimed in claim 1, said means for producing a magnetic field comprising a field coil connected to the control current source.

7. Measuring device as claimed in claim 1, wherein the point of application of the force to be measured on the movable member is integral with a flexible wall of a manometric capsule.

8. Measuring device as claimed in claim 1, wherein the points of application of the force to b emeasured on the movable member are integral with two opposite flexible walls of a differential manometric capsule.

9. Device for measuring a force which is exerted on a movable member, said device comprising: means for producing a magnetic field and formed of a magnetizable core, a field coil which surrounds said core and a pot magnet having a base which is coupled to one extremity of said core whilst the portion opposite to said base surrounds the other extremity of said core so as to leave an annular air-gap; a Hall generator comprising a semiconductor strip having input and output terminals, the semiconductor strip being interposed in said core at right angles to the axis of said core; a first current source connected to the input terminals of said Hall generator; a first amplifier whose input is connected to the output terminals of said Hall generator and the output of which is connected to said field coil; a moving coil disposed within said annular air-gap, said moving coil being coupled to and movable with the movable member in a direction parallel to the axis of said core; means for detecting the position of said movable member; a second current source controlled by said position detecting means and connected to supply current to said moving coil; and measuring means interposed in the current supply circuit to said moving coil.

10. Measuring device as claimed in claim 9, wherein the second current source consists of a second amplifier whose input is connected to said position detecting means and whose output is connected to said moving coil.

11. Measuring device as claimed in claim 10, wherein the measuring means consist of digital control means adapted to obtain directly in numerical form the value of the force to be measured.

12. Measuring device as claimed in claim 11, wherein the digital control means comprise: a demodulator whose input is connected to the output of the second amplifier whose input is connected to the means for detecting the position of the movable member; a pulse-switching unit having two outputs, a control input connected to the output of said demodulator and an input for periodic pulses supplied to said switching unit, said switching unit being adapted to switch-over the pulses which it receives towards one or the other of its two outputs depending on the sign of the voltage applied thereto by said demodulator; a digital counting and back-counting unit whose input is connected to the outputs of the switching unit so as to feed to the counting and back-counting unit the pulses supplied to said switching unit; signal-transforming means whose input is connected to said digital counting and back-counting unit and which are adapted to transform binary-code data as defined by the state of said digital counting and back-counting unit into rectangular signals having constant amplitude and fixed recurrence, the duration of which is a function of the state of said digital counting and back-counting unit; and a third amplifier whose input is connected to said signal-transforming means and the output of which is connected to said moving coil.

13. Measuring device as claimed in claim 12, wherein the signal-transforming means comprise: a fast pulse generator; an AND-gate whose input is connected to said pulse generator; a high-speed counter connected to said AND-gate; a slow pulse generator; a series of AND-gates connected to said slow pulse generator so as to be controlled by said generator, the inputs of which are connected to said digital counting and back-counting unit and the outputs of which are connected to said high-speed counter; a delaying monostable device whose input is connected to said slow pulse generator; an OR-gate connected to the output of said high-speed counter so as to be controlled by said counter and having an input which is connected to said delaying monostable device; a flip-flop connected to the output of said OR-gate and having two outputs, one of which is connected to the input of the periodic pulses of said switching unit so as to transmit thereto the pulses supplied from the slow pulse generator, whilst the other output is connected, on the one hand, to the third amplifier and, on the other hand, to the control terminal of said AND-gate.

14. Measuring device as claimed in claim 9, wherein the first current source is an alternating-current source which is in series with a resistance and further comprising: a differential transformer having two primary windings and one secondary winding, one of the primary windings being connected to the output terminals of the Hall generator, whilst the other primary winding is connected to the terminals of said resistance, said primary windings being arranged in such manner that the voltage which appears at the terminals of the secondary winding is equal to the difference in voltages applied to the two primary windings; a second alternating-current amplifier whose input is connected to the terminals of the secondary winding; and a demodulator whose input is connected to the output of said second alternating-current amplifier and whose output is connected to said field coil.

References Cited by the Examiner

UNITED STATES PATENTS

| 2,620,665 | 12/1952 | Carlisle et al. | 73—398 |
| 2,849,669 | 8/1958 | Kinkel | 73—141 X |
| 2,988,650 | 6/1961 | Weiss | 318—28 X |
| 3,081,637 | 3/1963 | Gevas | 73—517 |
| 3,131,564 | 5/1964 | Romberg | 73—517 X |

FOREIGN PATENTS

| 782,774 | 9/1957 | Great Britain. |

RICHARD C. QUEISSER, *Primary Examiner.*

C. A. RUEHL, *Assistant Examiner.*